United States Patent [19]
Kondo et al.

[11] Patent Number: 4,570,177
[45] Date of Patent: Feb. 11, 1986

[54] CARRIER CHROMINANCE SIGNAL SEPARATING CIRCUIT

[75] Inventors: Tetsuya Kondo, Kawasaki; Yoshihiro Kosugi, Tokyo, both of Japan

[73] Assignee: Sony Corporation, Tokyo, Japan

[21] Appl. No.: 515,052

[22] PCT Filed: Oct. 21, 1982

[86] PCT No.: PCT/JP82/00418
§ 371 Date: Jun. 22, 1983
§ 102(e) Date: Jun. 22, 1983

[87] PCT Pub. No.: WO83/01554
PCT Pub. Date: Apr. 28, 1983

[30] Foreign Application Priority Data
Oct. 23, 1981 [JP] Japan .................. 56-169909

[51] Int. Cl.$^4$ ........................... H04N 9/64
[52] U.S. Cl. ................................ 358/31
[58] Field of Search ...................... 358/31

[56] References Cited
U.S. PATENT DOCUMENTS
4,263,612  4/1981  Gibson et al. ............... 358/31

Primary Examiner—Michael A. Masinick
Attorney, Agent, or Firm—Lewis H. Eslinger; Alvin Sinderbrand

[57] ABSTRACT

In accordance with a carrier chrominance signal separating circuit of this invention, a mixed signal containing a carrier chrominance signal C is supplied to a delay circuit (6) and delayed one horizontal period. This delayed signal and an original color video signal are supplied to a subtracting circuit (14) and the subtracted output therefrom and the original color video signal are supplied to an amplitude correlating circuit (9) from which the carrier chrominance signal is generated. Thus, even if the carrier chrominance signal C includes signal portions having no vertical correlation therebetween, the carrier chrominance signal will never be lost or attenuated.

5 Claims, 18 Drawing Figures

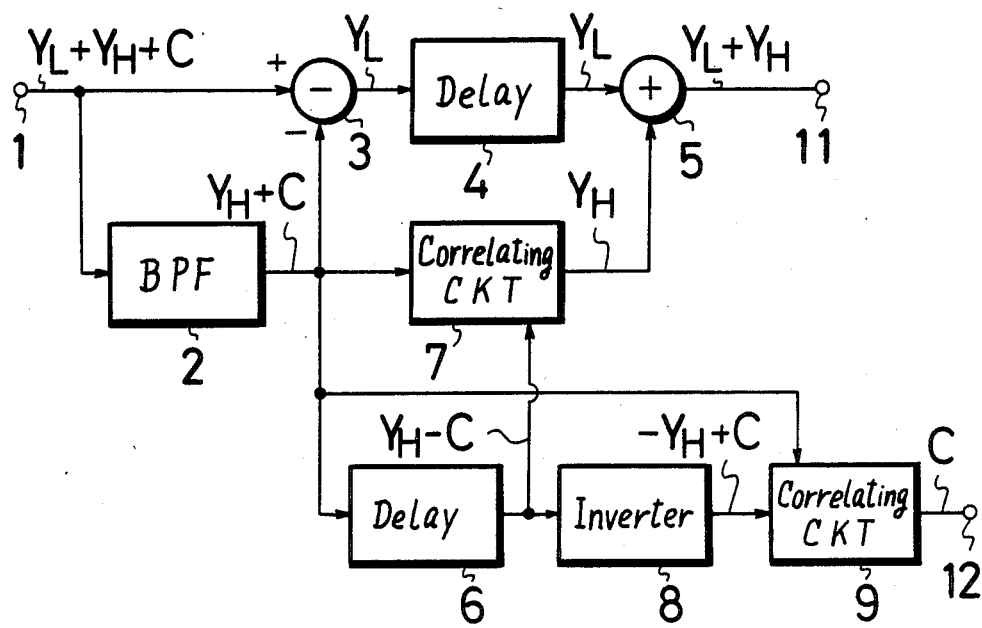

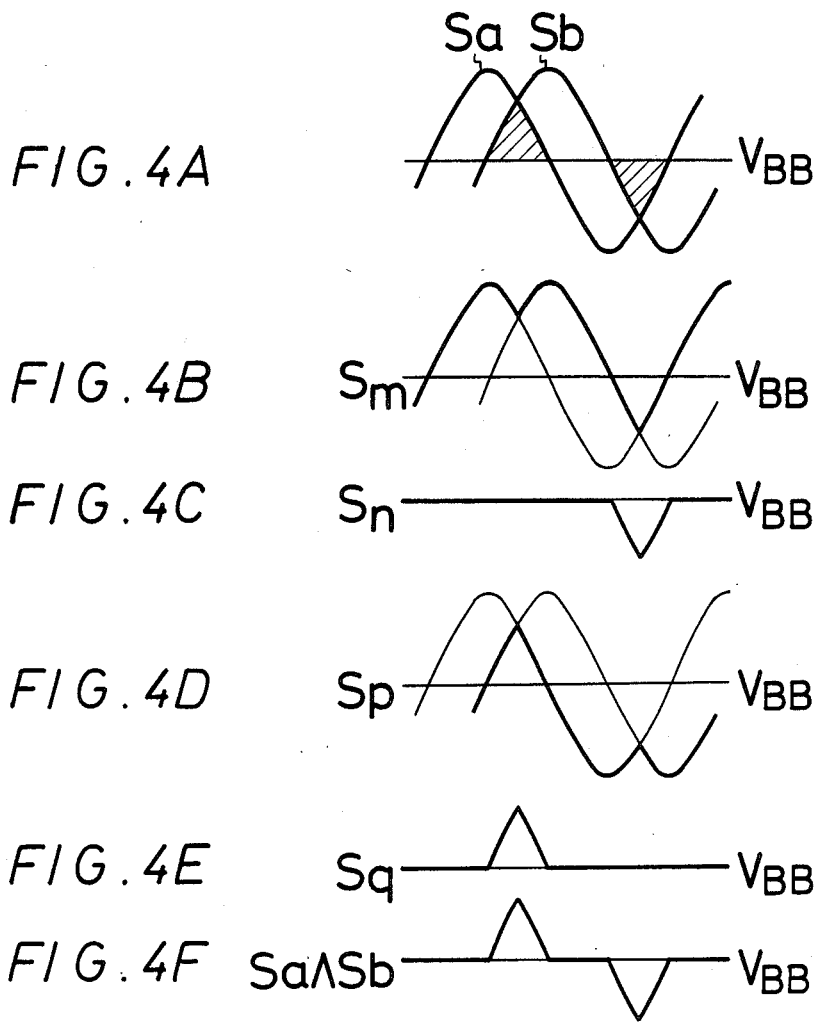
FIG. 4A
FIG. 4B
FIG. 4C
FIG. 4D
FIG. 4E
FIG. 4F
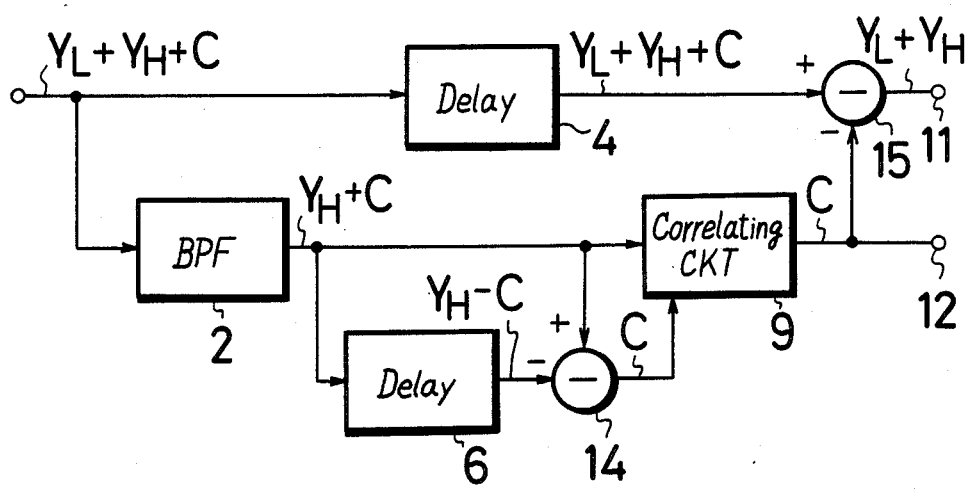
FIG. 5

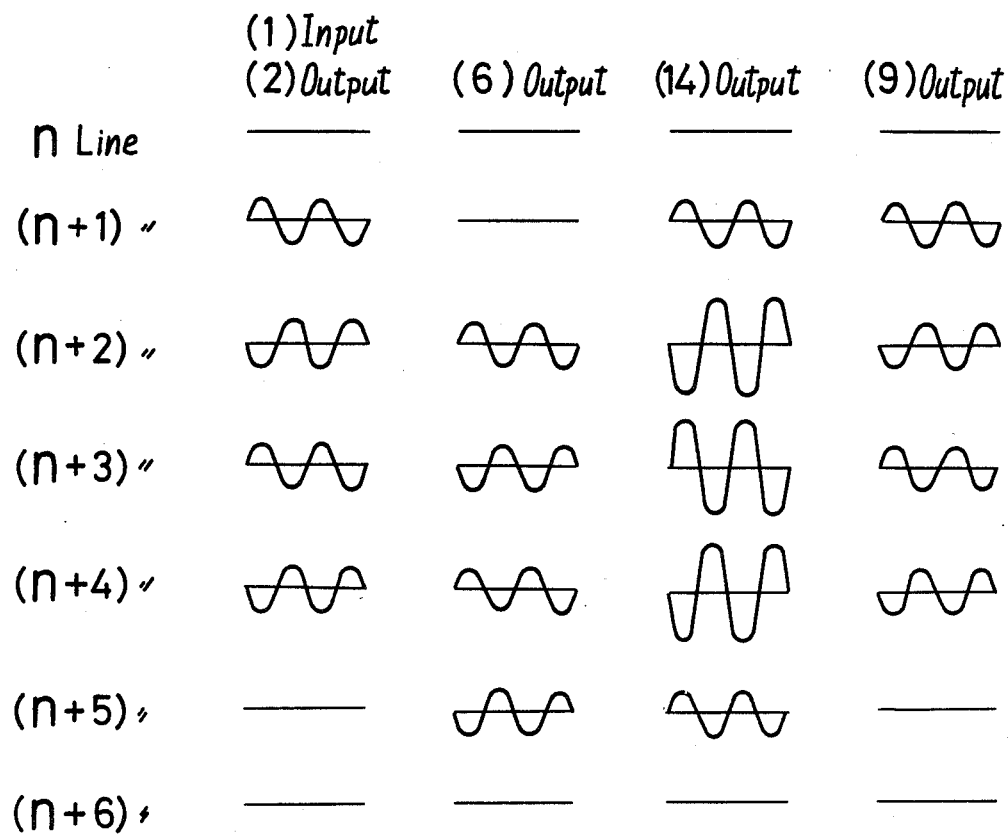
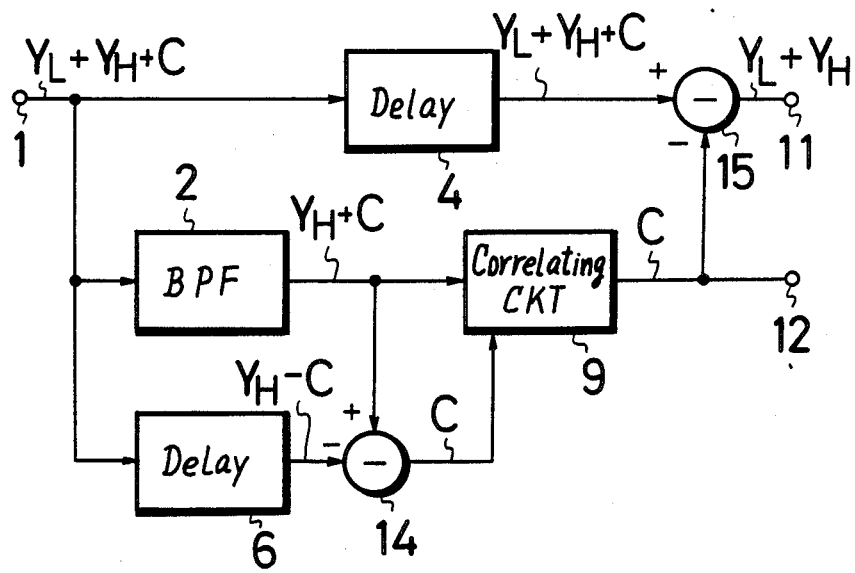

CARRIER CHROMINANCE SIGNAL SEPARATING CIRCUIT

DESCRIPTION

1. Technical Filed

This invention relates to such a technique that in a comb filter for separating a carrier chrominance signal from a color video signal, even if the carrier chrominance signal contains portions having no vertical correlation, the carrier chrominance signal can be correctly extracted.

2. Background Art

A comb filter is known as a filter for separating a luminance signal and a carrier chrominance signal from a color video signal. Further, a comb filter has been proposed which can avoid a dot interference and a cross color.

FIG. 1 is a block diagram showing an example thereof. A color video signal, or a composed signal $(Y_L+Y_H+C)$ consisting of a low frequency band component $Y_L$ and a high frequency band component $Y_H$ of a luminance signal Y and a carrier chrominance signal C is supplied to a terminal 1. The signal $(Y_L+Y_H+C)$ is supplied to a band-pass filter 2 which passes therethrough a signal $(Y_H+C)$. This signal $(Y_H+C)$ and the signal $(Y_L+Y_H+C)$ are both supplied to a subtracting circuit 3 from which is derived the low frequency band component $Y_L$. This low frequency band component $Y_L$ is supplied through a phase compensation delay circuit 4 to an adding circuit 5.

The signal $(Y_H+C)$ from the filter 2 is supplied to a delay circuit 6 and delayed by one horizontal period so that the delay circuit 6 delivers a signal $(Y_H-C)$ consisting of the high frequency band component $Y_H$ of one horizontal period before and a carrier chrominance signal $-C$ of opposite phase. The signal $(Y_H-C)$ and the signal $(Y_H+C)$ from the filter 2 are supplied to an amplitude correlating circuit 7.

The correlating circuit 7 is an analog-AND circuit the example of which will be described later. When this circuit is supplied with two signals Sa and Sb as, for example, shown in FIG. 4A, it produces correlated portions (hatched areas) of both the signals Sa and Sb as shown in FIG. 4F. Accordingly, the correlating circuit 7 delivers the high frequency band component $Y_H$.

The high frequency band component $Y_H$ is then supplied to the adding circuit 5 which then delivers the luminance signal $Y (=Y_L+Y_H)$ to a terminal 11.

The signal $(Y_H-C)$ from the delay circuit 6 is supplied further to an inverter 8 from which a signal $(-Y_H+C)$ of inverted phase is derived. The signal $(-Y_H+C)$ and the signal $(Y_H+C)$ from the filter 2 are supplied to a correlating circuit 9 which delivers the carrier chrominance signal C to a terminal 12.

FIG. 3 is a circuit diagram showing an example of the correlating circuits 7 and 9. When the signals Sa and Sb as shown in FIG. 4A are supplied to terminals Ta and Tb, transistors $Q_1$ and $Q_2$ generate a signal Sm as shown in FIG. 4B so that from transistors $Q_3$ and $Q_4$ is derived a portion Sn corresponding to the correlated portion of the negative half cycle period of the signals Sa and Sb as shown in FIG. 4C. Since from transistors $Q_5$ and $Q_6$ is derived a signal $S_p$ as shown in FIG. 4D, transistors $Q_7$ and $Q_8$ produce a correlated portion $S_q$ corresponding to a positive half cycle period of the signals Sa and Sb as shown in FIG. 4E. Accordingly, the correlated portions between the signals Sa and Sb, namely, a correlated signal (Sa ∧ Sb) shown in FIG. 4F is delivered to a terminal Tc.

Thus, according to the comb filter shown in FIG. 1, the luminance signal Y and the carrier chrominance signal C can be separated from the color video signal. In addition, in this case, no dot interference and no cross color occur.

However, in the comb filter shown in FIG. 1, if the carrier chrominance signal C in the color video signal supplied to the terminal 1 is that as shown in FIG. 2A, or only lines $(n+1)$ to $(n+4)$ thereof are colored, the carrier chrominance signals C at the respective circuit elements become as shown in FIGS. 2A to 2C and the carrier chrominance signal C which will appear at the terminal 12 becomes as shown in FIG. 2D. In other words, the carrier chrominance signal C on the line $(n+1)$ having no vertical correlation is lost or attenuated.

Accordingly, it is an object of this invention to provide a carrier chrominance signal separating circuit capable of obviating such defects and which can correctly separate the carrier chrominance signal C from the color video signal even if the carrier chrominance signal C contains no vertical correlation portion.

DISCLOSURE OF INVENTION

In accordance with the present invention, a mixed signal containing the carrier chrominance signal C is supplied to a delay circuit and delayed one horizontal period. This delayed signal and an original color video signal are supplied to a substracting circuit. The subtracted output therefrom and the color video signal are supplied to an amplitude correlating circuit from which is derived the carrier chrominance signal C. As a result, even if the carrier chrominance signal C contains a portion which does not have a vertical correlation, such chrominance signal is never lost or attenuated. Besides, the circuit arrangement of the separating circuit is simple.

BRIEF DESCRIPTION OF DRAWINGS

FIGS. 1, 2A, 2B, 2C, 2D, 3, 4A, 4B, 4C, 4D, 4E, 4F, 6A, 6B, 6C, and 6D are respectively diagrams useful for explaining this invention, and FIGS. 5 and 7 are respectively systematic diagrams of embodiments according to this invention.

Figure 3:
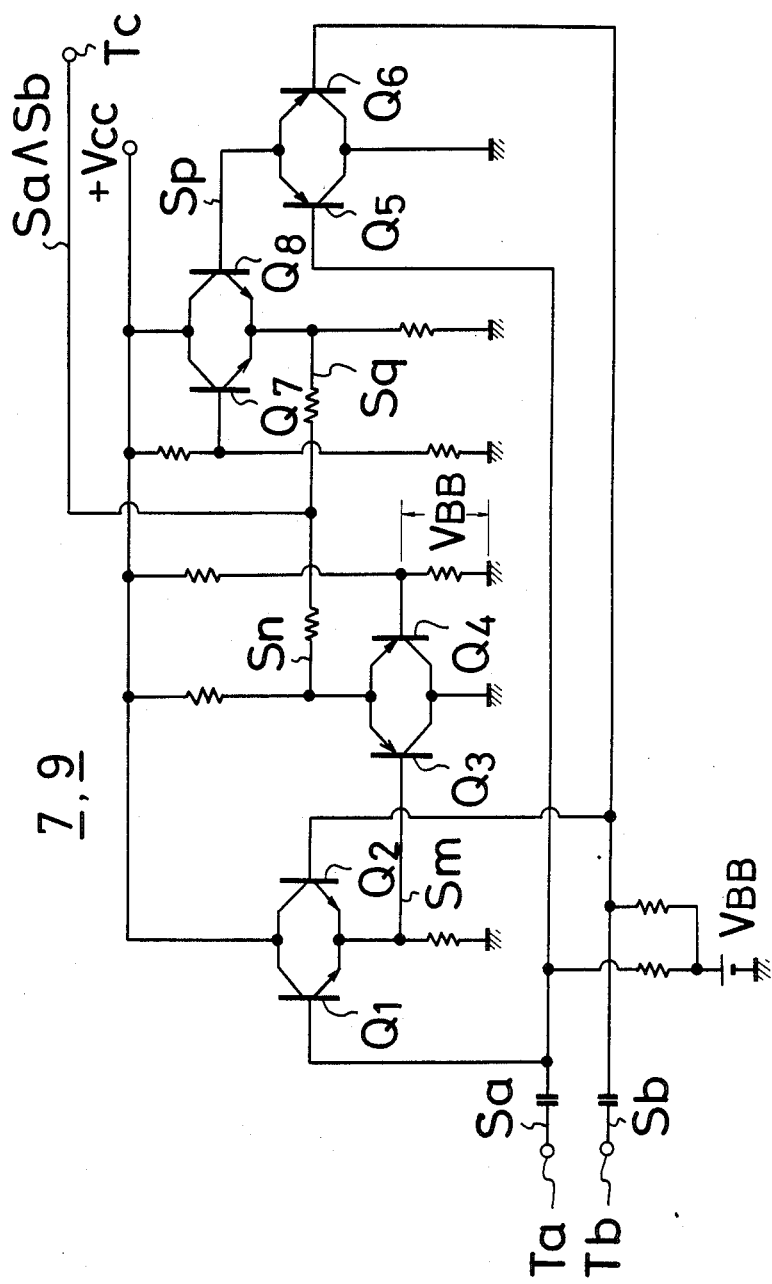

Reference numeral 2 represents the band-pass filter, 6 the delay circuit, and 9 the amplitude correlating circuit.

BEST MODE FOR CARRYING OUT THE INVENTION

FIG. 5 is a block diagram showing an embodiment of this invention. In FIG. 5, a color video signal $(Y_L+Y_H+C)$ is supplied through a terminal 1 to a band-pass filter 2 from which is derived a mixed signal $(Y_H+C)$ of a high frequency band component $Y_H$ and a carrier chrominance signal C. The signal $(Y_H+C)$ is supplied to a subtracting circuit 14 and a delay circuit 6 from which a signal $(Y_H-C)$ of one horizontal period before is derived. This signal $(Y_H-C)$ is supplied to the subtracting circuit 14 from which is derived a carrier chrominance signal C.

The signal C is supplied to a correlating circuit 9 and the signal $(Y_H+C)$ from the filter 2 is supplied to the correlating circuit 9 so that the carrier chrominance signal C is delivered therefrom which is then fed to a terminal 12.

The signal $(Y_L+Y_H+C)$ fed to the terminal 1 is supplied through a phase compensation delay circuit 4 to a subtracting circuit 15 and the carrier chrominance signal C from the correlating circuit 9 is also supplied to the subtracting circuit 15 from which is derived a luminance signal Y which is then delivered to a terminal 11.

In this case, if the carrier chrominance signal C in the color video signal supplied to the terminal 1 is that as shown in FIG. 6A (this is the same as that of FIG. 2A), the signal C from the filter 2 becomes as shown in FIG. 6A, too. Therefore, the signal C from the delay circuit 6 becomes that as shown in FIG. 6B and the signal C from the subtracting circuit 14 becomes that as shown in FIG. 6C. Namely, since at the subtracting circuit 14 the signal $(Y_H-C)$ is subtracted from the signal $(Y_H+C)$, although the signal C keeps its original level on the line (n+1), it increases its level twice as large as the original level on the lines (n+2) to (n+4) and then restores its original level on the line (n+5).

Since the signal C of such level and the signal $(Y_H+C)$ from the filter 2 are correlated to each other in the correlating circuit 9, the correlated output therefrom becomes the carrier chrominance signal C with the original level on the lines (n+1) to (n+4) as shown in FIG. 6D.

As set forth above, according to this invention, the luminance signal Y and the carrier chrominance signal C can be separated from the color video signal. Also, at that time, even if the carrier chrominance signal C includes the portion which has no vertical correlation, the carrier chrominance signal will never be lost or attenuated. In addition, the circuit arrangement therefor is made simple.

In another embodiment in FIG. 7, as the delay circuit 6 used is such one which has the characteristic similar to that of the band-pass filter 2 so that the delay circuit 6 is constructed at low cost.

We claim:

1. A circuit for separating a carrier chrominance signal from a color video signal even if the carrier chrominance signal contains portions lacking vertical correlation, said circuit comprising delay means for delaying a color video signal by one horizontal period, band-pass filter means for deriving a frequency band component of a carrier chrominance signal from said color video signal, subtracting means for performing a subtraction between an output of said band-pass filter means and an output of said delay means, and an amplitude correlating circuit supplied with the outputs from said band-pass filter means and said subtracting means to generate therefrom a signal of a level substantially close to a reference level, whereby a carrier chrominance signal is derived from said amplitude correlating circuit.

2. A carrier chrominance signal separating circuit according to claim 1, wherein said delay means is supplied with the output of said band-pass filter means.

3. A carrier chrominance signal separating circuit according to claim 1, wherein said delay means is directly supplied with said color video signal.

4. A carrier chrominance signal separating circuit according to claim 1, further comprising second delay means supplied with said color video signal and second subtracting means for performing the subtraction between an output of said second delay means and an output of said amplitude correlating circuit, so that a luminance signal is derived from said second subtracting means.

5. A carrier chrominance signal separating circuit according to claim 4, wherein said second delay means has a delay time suitable for compensating for the delay imparted by said band-pass filter means and said amplitude correlating circuit.

* * * * *